July 19, 1966 K. E. HILFING ETAL 3,261,262
SUPPORTS OF TURRETS OF ARMORED CARS
Filed Oct. 20, 1964 2 Sheets-Sheet 1

INVENTORS
K. E. Hilfing and B. A. H. Andersson
BY
Richards & Geier
ATTORNEYS

July 19, 1966    K. E. HILFING ETAL    3,261,262
SUPPORTS OF TURRETS OF ARMORED CARS
Filed Oct. 20, 1964    2 Sheets-Sheet 2

INVENTORS
K.E.Hilfing and B.A.H.Andersson
BY
Richards & Geier
ATTORNEYS 3,261,262
SUPPORTS OF TURRETS OF ARMORED CARS
Karl Erik Hilfing, Ornskoldsvik, and Bjorn Axel Henning Andersson, Gullanget, Sweden, assignors to Aktiebolaget Hagglund & Soner, Ornskoldsvik, Sweden, a corporation of Sweden
Filed Oct. 20, 1964, Ser. No. 405,198
Claims priority, application Sweden, Oct. 26, 1963, 11,801/63
10 Claims. (Cl. 89—36)

This invention relates to supports of turrets of armored cars and refers more particularly to a device for securing a rotary bearing ring on which a turret is mounted in an opening of the roof of an armored car.

In prior art constructions ball bearings are used for supporting a turret of an armored car, whereby balls rest in a groove of the car body and in a groove of a rotary bearing ring to which the turret is secured. This construction has the drawback that the balls are subjected to unequal loads when the recoil of the weapon carried by the turret takes place, since play between the balls and the grooves cannot be avoided; this is caused by the fact that the grooves are not perfectly round, either due to inexact manufacture or to varying deformations to which the car body is subjected.

An object of the present invention is to eliminate this drawback of prior art constructions.

Other objects will become apparent in the course of the following specification.

In accomplishing the objects of the present invention it was found desirable to provide a rotary bearing ring having a peripheral groove receiving the balls which also rest in a corresponding horizontal groove provided in the roof of the armored car; the rotary bearing ring is provided with a radially extending slot in which a wedge-like member is movable radially relatively to the ring. This construction has the effect of increasing or decreasing the peripheral width of the slot and, consequently, of increasing or decreasing the diameter of the rotary bearing ring. Thus the balls remain properly located in the two grooves.

The invention will appear more clearly from the following detailed description when taken in connection with the accompanying drawings showing, by way of example, a preferred embodiment of the inventive idea.

Figure 1:
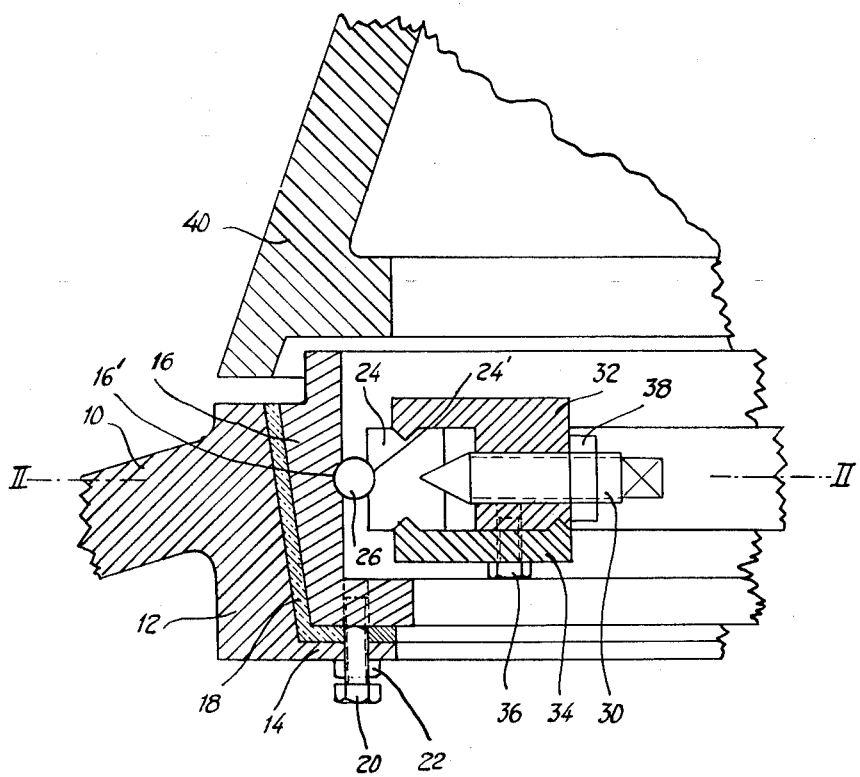
FIGURE 1 is a vertical radial section along the line I—I of FIG. 2 through a turret-supporting rotary bearing ring constructed in accordance with the principles of the present invention, as well as parts cooperating with the ring.

The drawing shows a portion of an armored car having a roof 10 and a turret 40. The roof 10 has a circular opening. A supporting ring 12 surrounding this opening is firmly connected with the roof by welding or other suitable means. The ring 12 is provided at its lower end with an inwardly extending horizontal flange 14. The supporting ring 12 has a conical inner surface for receiving a stationary outer bearing ring 16 provided with a correspondingly shaped conical outer surface. This conical outer surface and the lower surface of the ring 16 are spaced from the corresponding surfaces of the ring 12 and this space is filled with a layer of cast resin 18, such as a cold setting epoxy resin. The resin layer 18 forms a seat for the ring 16 and connects the ring 16 with the ring 12. However, those surfaces of the ring 16 which will be in contact with the cast resin layer 18 are initially covered by a coating of paint, so as to make possible the removal of the ring 16 from the layer of resin 18.

The flange 14 of the ring 12 carries adjusting screws 20 upon which the bearing ring 16 rests. Thus the bearing ring 16 can be adjusted vertically before the resin 18 is poured in. After the resin has set, the adjusting screws 20 can serve the purpose of facilitating the removal of the ring 16 from its seat constituted by the layer of resin 18. Fastening screws 22 extend into the outer bearing ring 16 and are driven against the flange 14 of the supporting ring 12 in order to secure the bearing ring 16 against becoming loose. These means of securing the bearing ring 16 have various advantages, namely, that the bearing ring will not be affected by radially directed forces when being placed into the supporting ring 12, so that the bearing ring 16 will at all times preserve its radius of curvature, which will remain exact and constant, as well as a correct adjustment. Furthermore, any subsequent treatment of the inner surface of the supporting ring 12 becomes unnecessary. Finally, the load transmission from the bearing ring 16 to the supporting ring 12 and thus to the roof 10 of the car will not cause any deformation of the outer bearing ring 16.

An inner bearing ring 24 is provided within the stationary bearing ring 16. The bearing ring 24 is rotatable relatively to the ring 16. The connection between the two rings 16 and 24 is provided by steel balls 26 rolling in a groove $16^1$ provided in the outer bearing ring 16 and in a corresponding groove formed in the ring 24.

Figure 2:
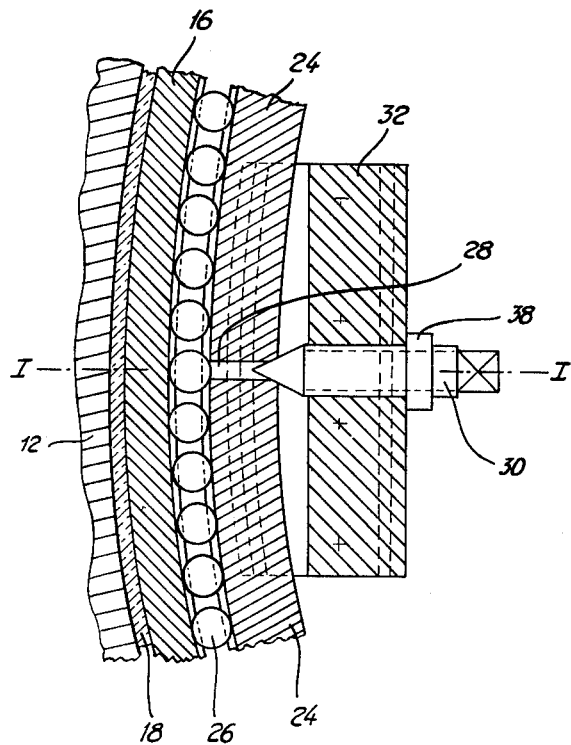
FIGURE 2 is a partial horizontal section along the line II—II of FIG. 1.

As best shown in FIG. 2, the inner bearing ring 24 has a radial slit 28 in a single location upon its periphery. Thus the ring 24 constitutes actually a split ring, the two ends of which can be moved closed together or shifted further apart, whereby the diameter of the ring is decreased or increased. These changes vary the distance between the two grooves of the outer and inner bearing rings. Consequently, by varying the width of the slit 28, an exact and fixed location for movement without play of the balls 26 can be provided. This adjustment in the size of the slit 28 is effected by an adjusting screw 30 having a conical front end. This conical end of the screw 30 serves as a wedge which may extend to a greater or lesser extent into the slit 28, thereby changing the peripheral width of the slit. The adjusting screw 30 is located in a top hole of a clamping device carried by the ring 24 and consisting of an upper clamping member 32 and a lower clamping member 34. The members 32 and 34 have the shape of plates which are secured to each other by fastening screws 36. The plates 32 and 34 engage the upper and lower surfaces of the ring 24; the slit 28 is located in the center of the length of these plates. The adjustment can be carried out so that the inner bearing ring 24 can be rotated relatively to the outer bearing ring 16 easily and without any play. After the width of the slit 28 has been adjusted, the screw 30 is secured by a stop nut 38 and then the fastening screw 36 is tightened.

The turret 40 is mounted upon the inner bearing ring 24 in a manner known per se and not shown in the drawings.

It is apparent that the example disclosed above has been described solely by way of illustration and not by way of limitation, and that it is subject to many variations and modifications within the scope of the present invention. All such variations and modifications are to be included within the scope of the present invention.

What is claimed is:

1. In an armored car having a roof and a turret, a turret-supporting rotary bearing ring having a peripheral groove, means connected with said roof and forming a horizontal groove opposed to the first-mentioned groove, balls located in the two grooves, said rotary bearing ring having a peripheral slit, a clamping device carried by said rotary bearing ring, and comprising an upper plate-like member and a lower plate-like member, said members engaging opposite surfaces of said rotary bearing ring, said slit being located in the center of the length of said members, and a wedge-shaped screw carried by said members and having a conical front end movable radially within said slit to vary the peripheral width of said slit and thus vary the diameter of said rotary bearing ring, whereby play of balls in the two grooves may be eliminated.

2. In an armored car having a roof and a turret, a turret-supporting rotary bearing ring having a peripheral groove, a stationary bearing ring, means connecting said stationary bearing ring to the roof, said stationary bearing ring having a horizontal groove opposed to the first-mentioned groove, balls located in the two grooves, said rotary bearing ring having a peripheral slit, a clamping device carried by said rotary bearing ring and a wedge-shaped screw carried by said clamping device and having a conical front end movable radially within said slit to vary the peripheral width of said slit and thus vary the diameter of said rotary bearing ring, whereby play of balls in the two grooves may be eliminated.

3. In an armored car having a roof and a turret, a turret-supporting rotary bearing ring having a peripheral groove, a stationary bearing ring, a plastic layer connecting said stationary bearing ring with said roof, said stationary bearing ring having a horizontal groove opposed to the first-mentioned groove, balls located in the two grooves, said rotary bearing ring having a peripheral slit, and a wedge-shaped member movable radially within said slit to vary the peripheral width of said slit and thus vary the diameter of said rotary bearing ring, whereby play of balls in the two grooves may be eliminated.

4. An apparatus in accordance with claim 3, wherein said plastic layer consists of cast resin.

5. An apparatus in accordance with claim 4, wherein said cast resin layer consists of cold setting epoxy resin.

6. In an armored car having a roof and a turret, a turret-supporting rotary bearing ring having a peripheral groove, a stationary bearing ring having a conical surface, a plastic layer engaging said conical surface for removably connecting said stationary bearing ring with said roof, said stationary bearing ring having a horizontal groove opposed to the first-mentioned groove, balls located in the two grooves, said rotary bearing ring having a peripheral slit, and a wedge-shaped member movable radially within said slit to vary the peripheral width of said slit and thus vary the diameter of said rotary bearing ring, whereby play of balls in the two grooves may be eliminated.

7. An apparatus in accordance with claim 6, wherein said conical surface of the stationary bearing ring is coated with paint.

8. In an armored car having a roof and a turret, a turret-supporting rotary bearing ring having a peripheral groove, a stationary bearing ring, a member connected with said roof and having a horizontal flange extending below said stationary bearing ring, a plastic layer located between said flange and said stationary bearing ring, said stationary bearing ring having a horizontal groove opposed to the first-mentioned groove, balls located in the two grooves, said rotary bearing ring having a peripheral slit, and a wedge-shaped member movable radially within said slit to vary the peripheral width of said slit and thus vary the diameter of said rotary bearing ring, whereby play of balls in the two grooves may be eliminated.

9. An apparatus in accordance with claim 8, further comprising an adjustment screw carried by said flange and engaging said stationary bearing ring.

10. An apparatus in accordance with claim 9, further comprising a fastening screw extending through said flange and into said stationary bearing ring.

References Cited by the Examiner

UNITED STATES PATENTS 2,712,271   7/1955   Wabnitz _____ 89—36 X

FOREIGN PATENTS 404,602   4/1932   Great Britain.

BENJAMIN A. BORCHELT, *Primary Examiner.*

FRED C. MATTERN, Jr., *Examiner.*